US012080060B2

United States Patent
Feng et al.

(10) Patent No.: US 12,080,060 B2
(45) Date of Patent: Sep. 3, 2024

(54) METHOD AND SYSTEM FOR INDOOR MULTIPATH GHOSTS RECOGNITION

(71) Applicants: Imec vzw, Leuven (BE); Katholieke Universiteit Leuven, KU LEUVEN R&D, Leuven (BE)

(72) Inventors: Ruoyu Feng, Leuven (BE); Andre Bourdoux, Theux (BE); Hichem Sahli, Etterbeek (BE); Sofie Pollin, Rotselaar (BE)

(73) Assignees: Imec vzw, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 152 days.

(21) Appl. No.: 17/448,250

(22) Filed: Sep. 21, 2021

(65) Prior Publication Data

US 2022/0114363 A1 Apr. 14, 2022

(30) Foreign Application Priority Data

Oct. 8, 2020 (EP) ..................................... 20200713

(51) Int. Cl.
*G06K 9/00* (2022.01)
*G01S 13/72* (2006.01)
(Continued)

(52) U.S. Cl.
CPC ............ *G06V 20/00* (2022.01); *G01S 13/723* (2013.01); *G01S 13/89* (2013.01); *G06T 7/277* (2017.01);
(Continued)

(58) Field of Classification Search
CPC .................... G06V 20/00; G06T 7/277; G06T 2207/10044; G06T 2207/20061; G01S 13/723; G01S 13/89
See application file for complete search history.

(56) References Cited

U.S. PATENT DOCUMENTS

2015/0204972 A1 * 7/2015 Kuehnle ................. G01S 13/42
342/156

FOREIGN PATENT DOCUMENTS

| CN | 109270526 A | | 1/2019 | |
|---|---|---|---|---|
| EP | 3525002 A1 | * | 8/2019 | ............ G01S 13/04 |
| JP | 2017096840 A | * | 6/2017 | |

OTHER PUBLICATIONS

Ferdman, Yossef, Daniel Yekutieli, and Nir Sochen. "A method for radar detection and range-Doppler estimation." 2017 IEEE International Conference on Microwaves, Antennas, Communications and Electronic Systems (COMCAS). IEEE, 2017 (Year: 2017).*

(Continued)

*Primary Examiner* — Bobbak Safaipour
*Assistant Examiner* — Jongbong Nah
(74) *Attorney, Agent, or Firm* — McDonnell Boehnen Hulbert & Berghoff LLP (57) ABSTRACT

A method is provided for indoor multipath ghosts recognition for a multiple-input-multiple-output radar with collocated antennas. The method includes the step of generating a two-dimensional Range-Doppler map for N number of consecutive radar data frames. The method further includes the step of applying a temporal clustering algorithm to the N number of consecutive radar data frames. Moreover, the method includes the step of applying a linear pattern extraction algorithm on the two-dimensional Range-Doppler map. In this context, the two-dimensional Range-Doppler map comprises detections from at least one target, at least one first-order ghost, and at least one second-order ghost with respect to one wall reflector.

20 Claims, 8 Drawing Sheets (51) Int. Cl.
  *G01S 13/89* (2006.01)
  *G06T 7/277* (2017.01)
  *G06V 20/00* (2022.01)
(52) U.S. Cl.
  CPC ............... *G06T 2207/10044* (2013.01); *G06T 2207/20061* (2013.01)

(56) References Cited

OTHER PUBLICATIONS

Sack, Daniel, and Wolfram Burgard. "A comparison of methods for line extraction from range data." IFAC Proceedings vols. 37.8 (2004): 728-733. (Year: 2004).*
Extended European Search Report and Written Opinion, Application No. EP20200713.4, mailed Mar. 16, 2021, 11 pages.
Naseri, Hassan, Jussi Salmi, and Visa Koivunen. "Indoor mapping using mimo radio channel measurements." In 2017 IEEE International Conference on Acoustics, Speech and Signal Processing (ICASSP), pp. 3321-3325. IEEE, 2017.
Johnson, Don H. "Application of the Hough transform to Doppler-time image processing." In ICASSP-88., International Conference on Acoustics, Speech, and Signal Processing, pp. 1212-1213. IEEE Computer Society, 1988.
Ding, Yipeng, Xiaoyi Lin, Kehui Sun, Xuemei Xu, and Xiyao Liu. "Human target localization using Hough transform and Doppler processing." IEEE Geoscience and Remote Sensing Letters 13, No. 10 (2016): 1457-1461.
Lan, Hua, Shuai Sun, Zengfu Wang, Quan Pan, and Zhishan Zhang. "Joint target detection and tracking in multipath environment: A variational Bayesian approach." IEEE Transactions on Aerospace and Electronic Systems 56, No. 3 (2019): 2136-2156.
Setlur, Pawan, Moeness Amin, and Fauzia Ahmad. "Multipath model and exploitation in through-the-wall and urban radar sensing." IEEE Transactions on Geoscience and Remote Sensing 49, No. 10 (2011): 4021-4034.
Li, Li, and Jeffery L. Krolik. "Simultaneous target and multipath positioning." IEEE Journal of Selected Topics in Signal Processing 8, No. 1 (2013): 153-165.
Duda, Richard O., and Peter E. Hart. "Use of the Hough transformation to detect lines and curves in pictures." Communications of the ACM 15, No. 1 (1972): 11-15.

* cited by examiner

METHOD AND SYSTEM FOR INDOOR MULTIPATH GHOSTS RECOGNITION

CROSS-REFERENCE TO RELATED APPLICATIONS

The present application is a non-provisional patent application claiming priority to European Patent Application No. 20200713.4, filed on Oct. 8, 2020, the contents of which are hereby incorporated by reference.

FIELD OF THE DISCLOSURE

The disclosure relates to radar-based indoor people detection and tracking, especially for multiple-input-multiple-output (MIMO) radars with collocated antennas.

BACKGROUND

Generally, collocated MIMO radars facilitate the exploitations of virtual antenna arrays with an angular resolution that is better than the resolution of the transmitter and the receiver alone. However, as with all indoor radar tracking and detection, MIMO radars suffer from multipath reflections. The multipath effect is challenging for radar sensing applications, especially in indoor scenarios due to dense static objects such as walls and furniture. Such multipath generates non-existing targets in radar detection, which are known in the art as "ghosts." In the art, ray-tracing is commonly used, which assumes that the geometry information of the multipath is the prior knowledge.

For example, the document CN 109270526 A shows a method for locating a corner object by using ray-tracing. However, beamforming, especially for a collocated MIMO radar, is not a suitable technique since the angle of ghosts cannot be estimated for MIMO radar with virtual antenna array and multipath. Therefore, the geometry of the multipath commonly used in ray-tracing based approach cannot be utilized for MIMO radars.

SUMMARY

Examples include a method and a device for indoor multipath ghosts recognition without using prior knowledge of the room geometry and to further perform target tracking and room boundary estimation.

According to a first aspect of the disclosure, a method is provided for indoor multipath ghosts recognition for a multiple-input-multiple-output radar with collocated antennas. The method comprises the step of generating a two-dimensional Range-Doppler map for N number of consecutive radar data frames. The method further comprises the step of applying a temporal clustering algorithm to the N number of consecutive radar data frames. Moreover, the method comprises the step of applying a linear pattern extraction algorithm on the two-dimensional Range-Doppler map. In this context, the two-dimensional Range-Doppler map comprises detections from at least one target, at least one first-order ghost, and at least one second-order ghost with respect to one wall reflector.

In some examples, the linear pattern extraction algorithm is a split-and-merge algorithm, for example a Random Sample Consensus algorithm, or a Hough transform based linear pattern extraction algorithm. Alternately, the linear pattern extraction algorithm can be based on Incremental algorithm, Line-Regression algorithm, Expectation-Maximization algorithm, and the like.

Therefore, the proposed disclosure addresses the multipath problem for radar-based localization systems, especially in indoor scenarios, where multipath is caused by the reflection from static objects like walls and furniture in the room and it creates false alarms in radar detection (ghosts). The disclosure addresses the specific case of collocated MIMO radars in multipath environment by exploiting a linear pattern of multipath ghosts in the Range-Doppler map. The proposed disclosure further solves the low detectability of any multipath components with a temporal clustering algorithm, for example a density-based spatial clustering of applications with noise (DBSCAN) algorithm.

According to a first implementation form of the first aspect of the disclosure, the method further comprises the step of recognizing, by means of the linear pattern extraction algorithm, a set of three points in the two-dimensional Range-Doppler map corresponding to the detections from the at least one target, the at least one first-order ghost, and the at least one second-order ghost. In this regard, the set of three points in the two-dimensional Range-Doppler map are aligned and are potentially equidistant.

Therefore, a pattern of the detections from the target and the multipath ghosts is recognized by means of the linear pattern extraction algorithm that detects all lines connecting the three points in the Range-Doppler map. Upon detecting the three points on a line, the distances between the detections are observed in order to evaluate if the distance from the target to the first-order ghost is equal to the distance from the first-order ghost to the second-order ghost. If this is verified, the triplet is considered for further processing.

According to a second implementation form of the first aspect of the disclosure, the method further comprises the step of comparing respective Range and Doppler values of the set of three points in the two-dimensional Range-Doppler map, thereby recognizing the respective detections from the at least one target, the at least one first-order ghost, and the at least one second-order ghost.

Therefore, upon recognizing the set of three aligned and equidistant points in the two-dimensional Range-Doppler map, the respective Range or Doppler values are compared so as to identify the respective detections of the target and the multipath ghosts. For instance, with respect to measured Range values, the detection or point with the closest range is the actual target, and the first-order and the second-order ghosts are the ones with the mid and far range, respectively.

According to a further implementation form of the first aspect of the disclosure, the method further comprises the step of implementing a tracking algorithm in order to estimate a state of the at least one target. In addition to this or as an alternative, the method further comprises the step of implementing a joint target tracking and wall estimation algorithm in order to estimate a state of the at least one target and of the at least one second-order ghost. In an example, the tracking algorithm comprises non-linear filtration, for example an Extended Kalman Filter. Therefore, in addition to multipath ghosts detection, a real-time target tracking is also incorporated.

According to a further implementation form of the first aspect of the disclosure, the method further comprises the step of implementing a model, for example a Simultaneous Target and Multipath Positioning model, in order to estimate parameters of a reflector associated with the at least one first-order ghost and the at least one second-order ghost. Therefore, in addition to multipath ghosts detection, a reflector or wall estimation is incorporated while performing the real-time target tracking.

According to a further implementation form of the first aspect of the disclosure, the two-dimensional Range-Doppler map further comprises detections from a plurality of targets, a plurality of first-order ghosts, and a plurality of second-order ghosts. In this regard, the method further comprises the step of applying an iterative algorithm comprising the above-mentioned steps for each of the plurality of targets. For multiple targets with more ghosts detected, the proposed disclosure can be implemented iteratively in order to distinguish the targets and the ghosts step by step.

According to a further implementation form of the first aspect of the disclosure, the at least one target and/or the plurality of targets are non-rigid targets. Therefore, the target, e.g., a pedestrian, is an extended and non-rigid target, where the pedestrian is modeled as a torso and two arms in the multipath geometry.

According to a further implementation form of the first aspect of the disclosure, the multiple-input-multiple-output radar is a Doppler radar, for example a frequency-modulated continuous-wave radar. Therefore, the MIMO radar, especially in short-range, is able to perform distance measurements along with speed measurements with a high reliability, which can facilitate simultaneous target tracking and room boundary estimation.

According to a second aspect of the disclosure, a system for indoor multipath ghost recognition is provided. The system comprises a multiple-input-multiple-output radar with collocated antennas and a processor operably coupled to the multiple-input-multiple-output radar. The processor is configured to generate a two-dimensional Range-Doppler map for N number of consecutive radar data frames. The processor is further configured to apply a temporal clustering algorithm to the N number of consecutive radar data frames. Moreover, the processor is configured to apply a linear pattern extraction algorithm on the two-dimensional Range-Doppler map.

In this context, the two-dimensional Range-Doppler map comprises detections from at least one target, at least one first-order ghost, and at least one second-order ghost with respect to one wall reflector. The linear pattern extraction algorithm is for example a split-and-merge algorithm, for example a Random Sample Consensus algorithm, or a Hough transform based linear pattern extraction algorithm. Therefore, the proposed disclosure addresses multipath problem for radar-based localization systems, especially in indoor scenarios.

BRIEF DESCRIPTION OF THE FIGURES

The above, as well as additional, features will be better understood through the following illustrative and non-limiting detailed description of example embodiments, with reference to the appended drawings.

Embodiments of the disclosure are now further explained with respect to the drawings by way of example only, and not for limitation. In the drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Reference will now be made in detail to the embodiments of the present disclosure, examples of which are illustrated in the accompanying drawings. However, the following embodiments of the present disclosure may be variously modified and the range of the present disclosure is not limited by the following embodiments.

Figure 1A:
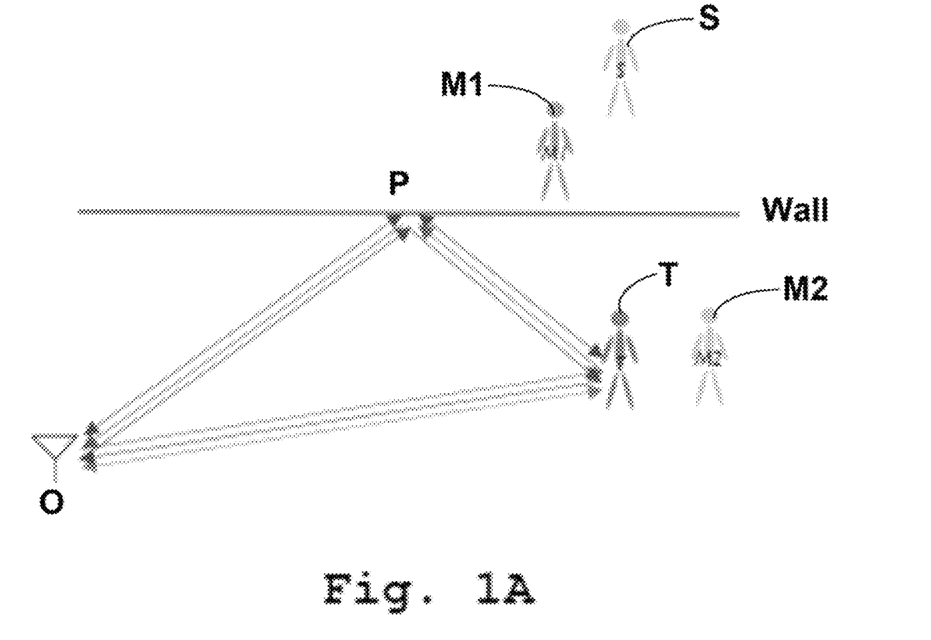
FIG. 1A shows a multipath geometry of radar detections with multipath, according to an example.
Figure 1B:
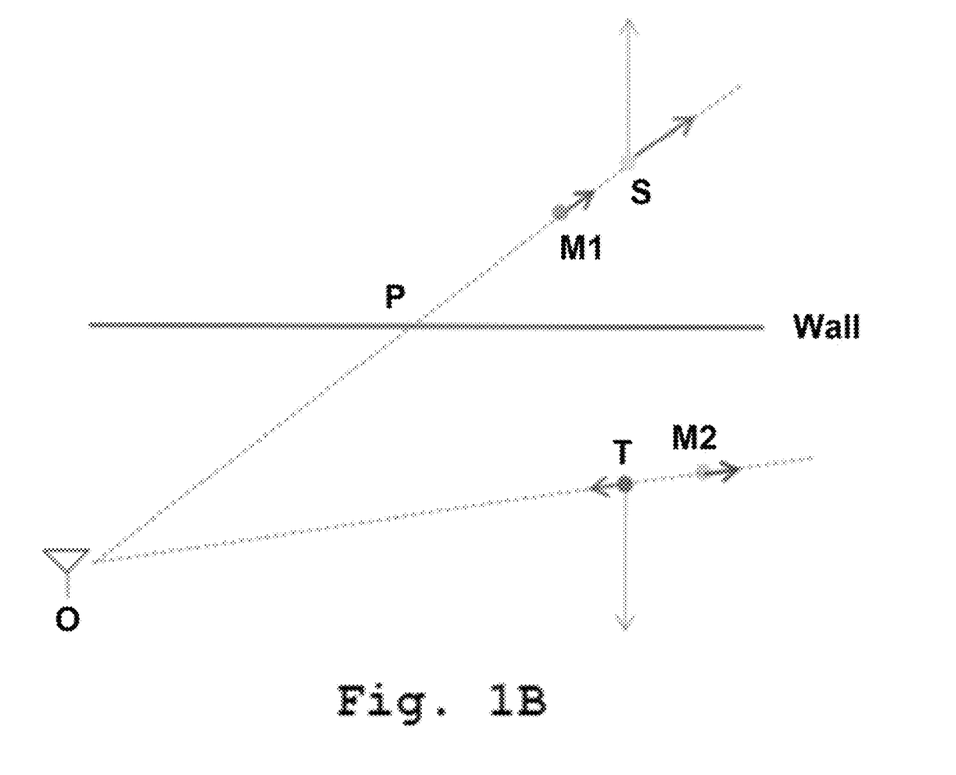
FIG. 1B shows Doppler velocity of the target and the ghosts for the multipath geometry of FIG. 1A, according to an example.

In FIG. 1A and FIG. 1B, a multipath geometry of radar detections with multipath ghosts and their respective Doppler velocity are illustrated by way of an example. The propagation paths of the radiation wave are illustrated by arrows. In this example, for a single target in the field of view, there are four propagation paths of the radar radiation. The radar is at point O, and the target is at point T. The direct reflection path OT+TO creates the detection of the real target in the received echo signals. Due to the scatter of the target and specular reflection of the wall, the indirect path includes OP+PT+TO, OT+TP+PO, and OP+PT+TP+PO. These indirect propagation paths create the detection of the ghosts, which are called the first-order ghost M1, the first-order ghost M2, and the second-order ghost S, respectively.

Given the multipath geometry, for a wall reflector, the information of the ghosts M1, M2, and S can be derived from the real target T and the wall position. Most popular state-of-the-art solutions assume prior knowledge of the room boundary and make use of ray-tracing to resolve the multipath problem. However, such prior knowledge is not realistic in real-world applications. Moreover, the ray-tracing approach utilizes the geometry information and the position of the real target to localize the ghosts and remove them. However, it relies on the accurate estimation of the targets' position using range-angle information. For a MIMO radar, due to the usage of a virtual antenna, the direction-of-arrival (DoA) and the direction-of-departure (DoD) are not equal for the first-order ghosts as indicated in FIG. 1A, which makes the classical beamforming not able to estimate the angle of the first-order ghosts.

Therefore, without the correct angle estimation, the solution in the state-of-the-art is not applicable to a MIMO radar working in a multipath environment, even if the room boundary is already known. Another solution in the state-of-the-art uses tracking algorithms with multipath models, which also do not require the room geometry information. However, such methods apply complicated multipath models, which are difficult to implement in a real-time system.

Figure 2:
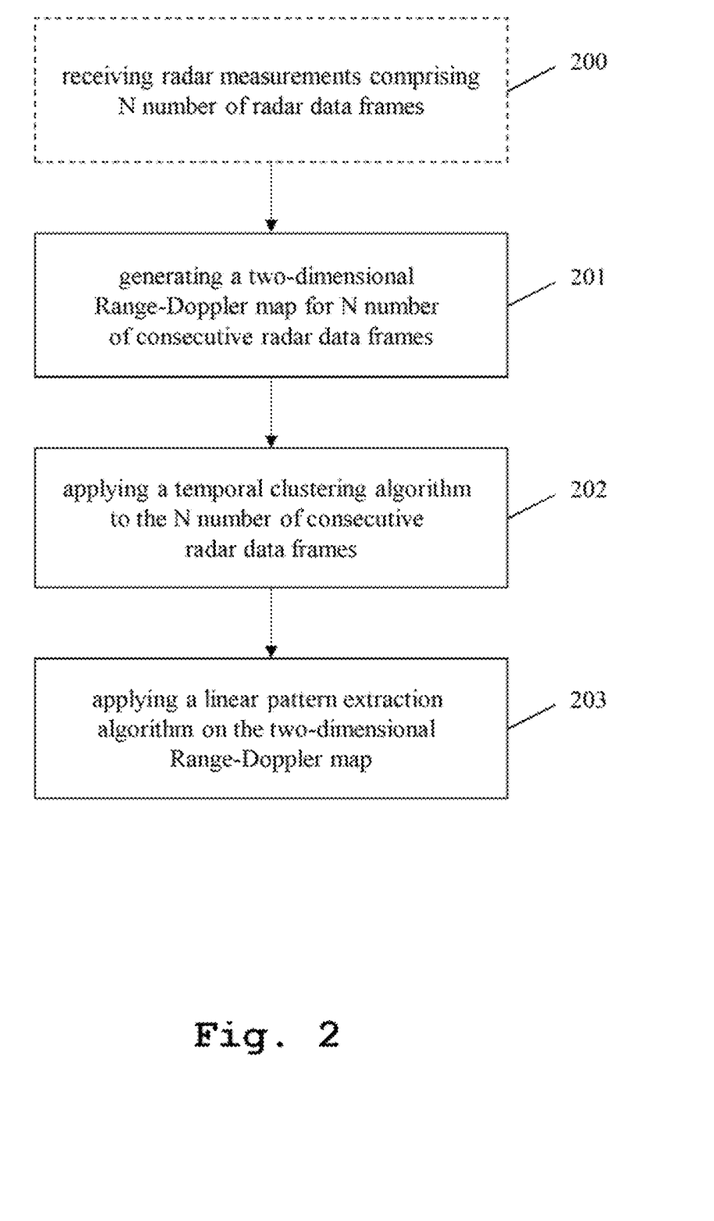
FIG. 2 shows an embodiment of the method according to the first aspect of the disclosure, according to an example.

In FIG. 2, an embodiment of the method according to the first aspect of the disclosure is illustrated. In an optional step 200, radar measurements comprising N number of radar data frames are received and are processed. In a first step 201, a two-dimensional Range-Doppler map is generated for the N number of consecutive radar data frames. In addition, the two-dimensional Range-Doppler map is processed in order to generate the Range-Doppler detections. In a second step 202, a temporal clustering algorithm is applied to the N number of consecutive radar data frames. In a third step 203, a linear pattern extraction algorithm is applied on the Range-Doppler detections. In this context, the two-dimensional Range-Doppler map or image is processed, for instance, by a constant false alarm rate (CFAR) detector in order to generate the detections.

In a consecutive step, a set of three aligned and equidistant points in the two-dimensional Range-Doppler map is recognized by means of the linear pattern extraction algorithm, where the points correspond to the detections from the at least one target, the at least one first-order ghost, and the at least one second-order ghost.

In a further consecutive step, the respective Range and Doppler values of the set of three points in the two-dimensional Range-Doppler map are compared with respect to each other, thereby recognizing the respective detections from the at least one target, the at least one first-order ghost, and the at least one second-order ghost.

Figure 3:
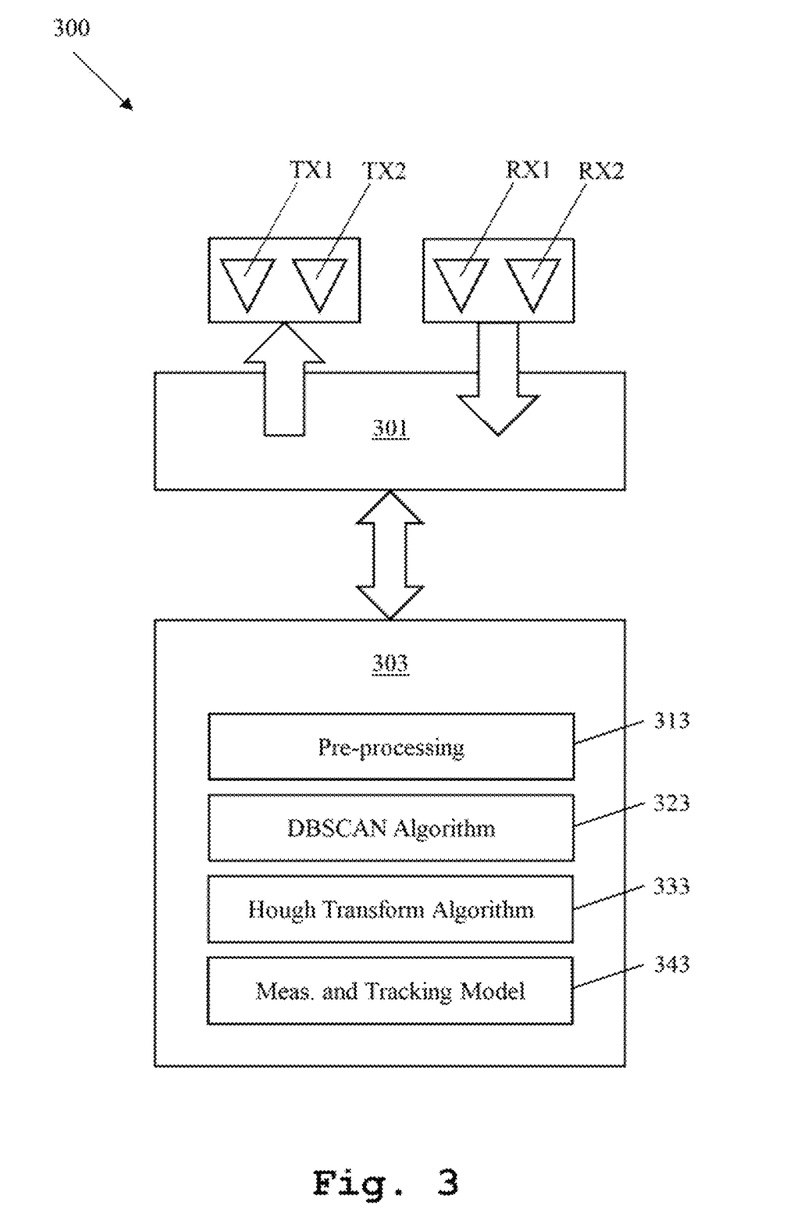
FIG. 3 shows an embodiment of the system according to the second aspect of the disclosure, according to an example.

In FIG. 3, an embodiment of the system 300 according to the second aspect of the disclosure is illustrated. The system 300 comprises a multiple-input-multiple-output radar 301 with collocated antennas TX1, TX2, RX1, and RX2. The system 300 further comprises a processor 303 operably coupled to the multiple-input-multiple-output radar 301. The term operably coupled means that the connection between the radar 301 and the processor 303 can be wireless or wired. Additionally, the radar 301 and the processor 303 can be incorporated into a single housing or setup. Alternately, the processor 303 can be implemented such that it can operate on the radar 301 from a remote location.

The processor 303 essentially gathers radar raw data by e.g., de-chirping of the radar echo signals and further performs pre-processing of the raw data. In this regard, the processor 303 generates a two-dimensional Range-Doppler map for N number of consecutive radar data frames and further processes the two-dimensional Range-Doppler map by means of a constant false alarm rate (CFAR) detector, e.g., an ordered-statistic constant false alarm rate (OS-CFAR) detector in order to generate the detections. The processor 303 then applies a temporal clustering algorithm, for example a DBSCAN clustering algorithm. In order to do so, for every consecutive N frames of radar data, i.e. the frames comprising the Range-Doppler data, the processor 303 overlaps the Range-Doppler detections into the same two-dimensional map and applies the DBSCAN algorithm on the clustered data.

Turning back to the multipath geometry of FIG. 1A, the wall is assumed as an ideal specular reflector and the position of the wall can be described by a linear equation such as:

$$Ax+By+C=0 \qquad (1)$$

The second-order ghost S is the mirror image of the real target T and has the symmetric position and velocity to the real target T. Given the position ($x_T$, $y_T$) and the velocity ($\dot{x}_T$, $\dot{y}_T$) of the real target T, the position and the velocity of the second-order ghost can be estimated as:

$$x_S = \frac{(B^2 - A^2)x_T - 2ABy_T - 2AC}{\sqrt{x^2+y^2}} \qquad (2a)$$

$$y_S = \frac{(A^2 - B^2)y_T - 2ABx_T - 2BC}{\sqrt{x^2+y^2}} \qquad (2b)$$

$$\dot{x}_S = \frac{(B^2 - A^2)\dot{x}_T - 2AB\dot{y}_T}{\sqrt{x^2+y^2}} \qquad (2c)$$

$$\dot{y}_S = \frac{(A^2 - B^2)\dot{y}_T - 2AB\dot{x}_T}{\sqrt{x^2+y^2}} \qquad (2d)$$

Where, the subscripts T and S denotes the actual target and the second-order ghost, respectively.

The range-angle in polar coordinates of T and S are ($R_T$, $D_T$) and ($R_S$, $D_S$) respectively, which can be calculated using the position and velocity. It is also conceivable from FIG. 1A that the propagation of the first-order ghosts M1 and M2 can be regarded as between the real target T and the second-order ghost S. The Range-Doppler of M1 and M2 are hence identical and are given by:

$$R_{M1}=R_{M2}=\tfrac{1}{2}(R_T+R_S) \qquad (3a)$$

$$D_{M1}=D_{M2}=\tfrac{1}{2}(D_T+D_S) \qquad (3b)$$

Therefore, it can be seen that the Range-Doppler information of T, M, and S are related. This particular pattern also shows that if the T, M, and S are aligned along a line, they are equidistant with respect to each other. The proposed disclosure utilizes this distinctive pattern of the received echo signals in order to detect and to further eliminate ghosts from radar echo signals.

In order to detect such patterns, the processor 303 applies a Hough transform based linear pattern extraction algorithm to detect all lines connecting the points corresponding to T, M, and S in the Range-Doppler map. The Hough transform is a popular method in image processing to recognize the lines from two-dimensional point clouds. The Hough transform represents a line in the Hesse normal form, which is:

$$r=x \cos \theta + y \sin \theta \qquad (4)$$

where r is the distance from the origin to the closest point on the line and θ is the rotation angle of the line connecting the origin with that closest point. Through this equation the lines in x-y space can be mapped to the Hough space, which enables the Hough transform algorithm to use a two-dimensional accumulator, to search the existence of linear relations in the parameters (r, θ). For each detection in the Range-Doppler map (R, D), the accumulator counts the number of points that fall into the bin representing a particular line.

In the algorithm proposed by this disclosure, if three points corresponding to T, M, and S are confirmed on a detected line of parameter (r, θ), the processor 303 estimates the distance between them to evaluate if the distance from the target T to the first-order ghost M is equal to the distance from the first-order ghost M to the second-order ghost S. If this is verified, the triplet is considered for further processing. Alternatively, if the difference between the two distances is smaller than a threshold, the triplet is considered for further processing. The aforesaid alternative approach is effective since most targets are considered as extended and non-rigid targets, which may lead to a level of uncertainty in the linear pattern extraction. The Hough transform handles noisy data/points by finding approximate lines, which further eases the process with extended targets as pedestrians.

Figure 4A:
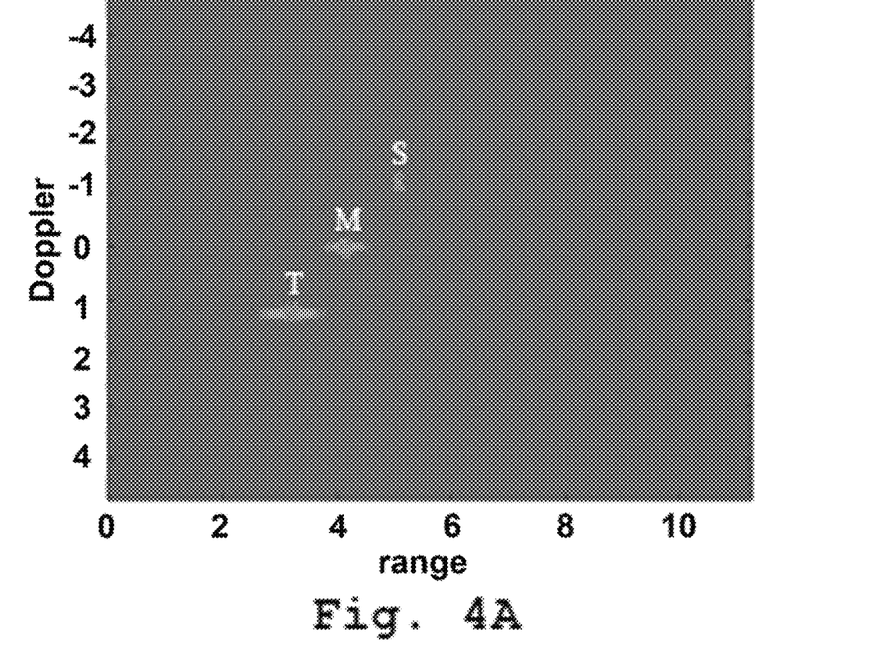
FIG. 4A shows a Range-Doppler map of the single target and its ghosts, according to an example.

In FIG. 4A, a Range-Doppler map of the single target and its ghosts is illustrated by way of an example. On the two-dimensional Range-Doppler map, the horizontal axis represents the measured range in meters and the vertical axis represents the measured Doppler velocity in meter per second. For instance, according to equations 3a and 3b, and with respect to measured range values, the detection or point with the closest range is the actual target T, and the first-order ghost M and the second-order ghosts S are the ones with the mid and far range, respectively.

The above-mentioned algorithm relies on the fact that, in the Range-Doppler map, each single target (with a wall) has three detections: T, M and S. However, in the low signal-to-noise ratio (SNR) condition, ghosts can be incorrectly detected in some frames of Range-Doppler map, which leads to failure in ghost recognition since not all three points can be found. To resolve this issue, the processor 303 applies the temporal clustering algorithm. In this regard, the processor 303 overlaps the N consecutive frames of Range-Doppler maps, and then applies a DBSCAN clustering to these Range-Doppler detections. In other words, for every consecutive N frames of MIMO radar data, the processor 303 overlaps the Range-Doppler detections into the same two-dimensional map and applies the DBSCAN algorithm on the clustered data that has a higher probability of containing all ghosts.

Figure 4B:
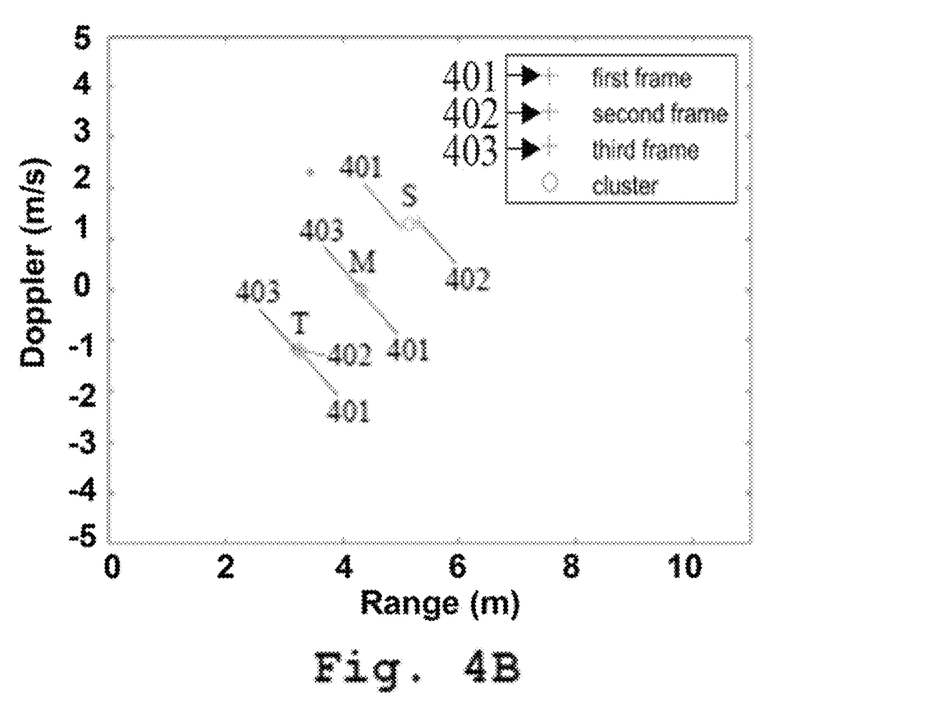
FIG. 4B shows a temporal clustering of three frames of Range-Doppler map, according to an example.

In FIG. 4B, a temporal clustering of three frames of a Range-Doppler map is illustrated. On the two-dimensional Range-Doppler map, the horizontal axis represents the measured range in meters and the vertical axis represents the measured Doppler velocity in meter per second. It can be seen that the detection of the target T is present in the first frame 401, the second frame 402 and the third frame 403. The detection of the first-order ghost M is present in the first frame 401 and in the third frame 403. Thus, the first-order ghost M is miss-detected in the second frame 402.

Moreover, the detection of the second-order ghost S is present in the first frame 401 and in the second frame 402. Thus, the second-order ghost S is miss-detected in the third frame 403. However, after temporal clustering, denoted by the circle for each of the target T, first-order ghost M, and second-order ghost S, the linear pattern with three centroids can be recognized. Hence, even if in some frames the ghosts are miss detected, after temporal clustering a linear pattern should be confirmed in the overlapped Range-Doppler maps.

Another benefit of temporal clustering is that the clutter that normally appears in some scans is removed since the clutter is not supposed to be stable within consecutive frames.

Figure 5A:
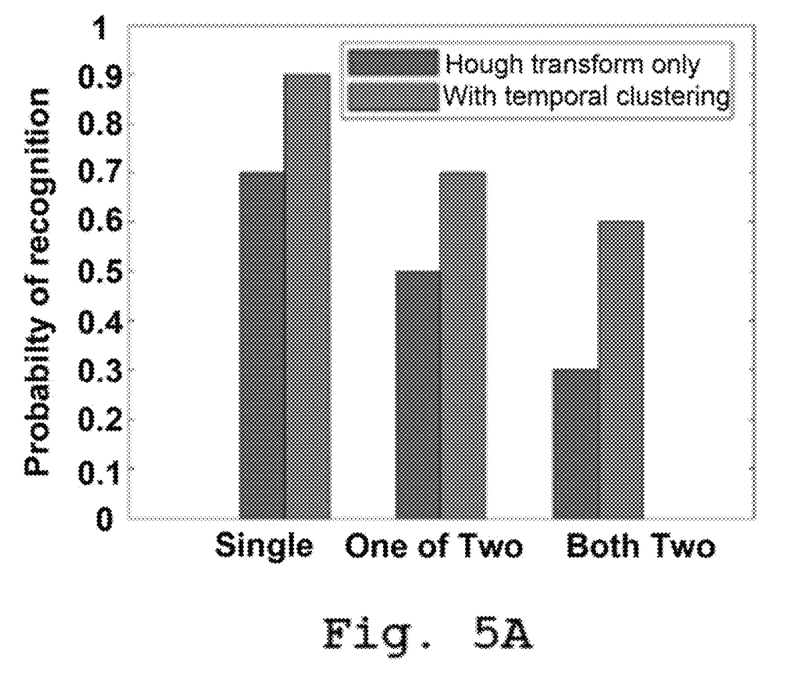
FIG. 5A shows simulated statistics of multipath ghosts recognition using Hough transform without and with temporal clustering, according to an example.
Figure 5B:
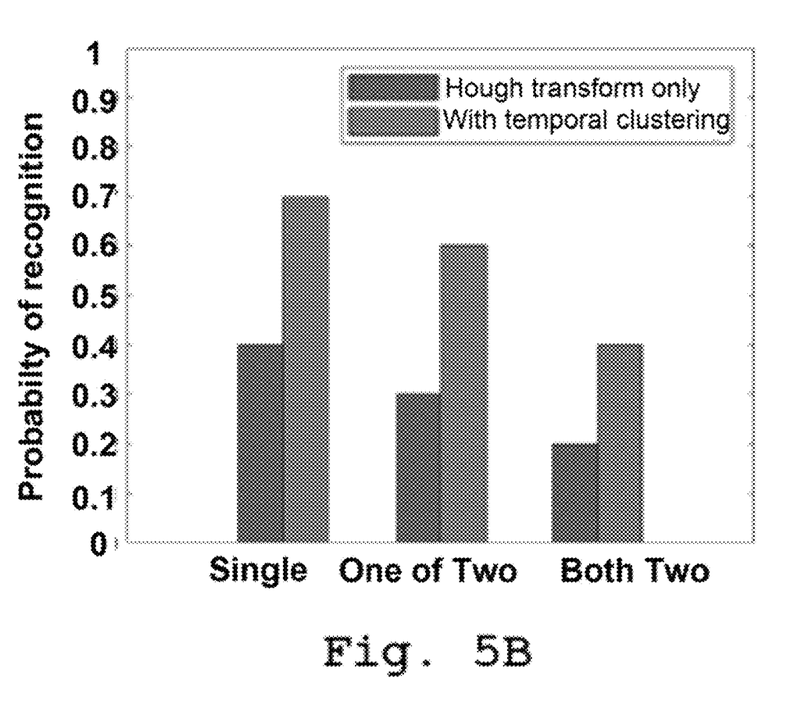
FIG. 5B shows measurement statistics of multipath ghosts recognition using Hough transform without and with temporal clustering, according to an example.

In FIG. 5A and FIG. 5B, the performance of Hough transform based ghost recognition is visualized. FIG. 5A shows the simulated probability of successful ghost recognition in simulations for single target scenario (left), two targets scenario with the detection of one of the targets (middle), and two targets scenario with the detection of both targets (right). FIG. 5B shows the actual probability of successful ghost recognition in a real environment for single target scenario (left), two targets scenario with the detection of one of the targets (middle), and two targets scenario with the detection of both targets (right).

As it can be seen, the incorporation of the clustering algorithm drastically improves the detection performance for all scenarios, where the improvements are more significant as the number of targets increases. It can also be seen that, compared to the simulation results, the actual probability of ghosts recognition is slightly decreased. One reason can be that the target is a real pedestrian in the actual probability performance, which is an extended and non-rigid target. Another reason can be that the real environment is harsher and has more clutter that can confuse the linear pattern extraction algorithm.

Turning back to FIG. 3, it can be summarized that the processor 303 essentially performs pre-processing 313 of the raw radar data, for instance, de-chirping and plotting the raw data into a two-dimensional Range-Doppler map for each radar data frame or data cubelet. The processor 303 further performs temporal clustering 323 on the consecutive radar data frames, especially by applying a DBSCAN clustering algorithm. The processor 303 then applies Hough transform based linear pattern extraction algorithm 333 in order to detect the target and the multipath ghosts in radar detection as well as to mitigate or eliminate the multipath ghosts. In addition, the processor 303 further executes measurement models in order to enhance the ghost detection and further executes tracking models 343 in order to perform multipath-assisted tracking and joint wall estimation. The measurement models and the tracking models 343 are detailed in the following sections.

As already described above, the Hough transform based ghosts recognition can determine whether the detection is the real target T, first-order ghost M, or second-order ghost S. Considering the multipath geometry in FIG. 1A, although the beamforming is not able to correctly estimate the angle of the first-order ghosts M, the angle of the real target T and second-order ghosts S can still be obtained. As a result, a joint tracking and wall estimation algorithm can be obtained through combining a direct-path and an in-direct path measurement model. The proposed disclosure further facilitates a multipath-assisted tracking and joint wall estimation, especially realized with Hough transform algorithm, with much lower computational complexity.

In a normal tracking model using a dynamic model with a constant velocity moving target, multipath is not taken into account, and states of the target is estimated by extended Kalman filter (EKF) through measurement model of the direct path. Considering the linear equation in (1), the line can expressed in Hesse normal form as by the parameters of $(\rho, \psi)$, where $\rho$ indicates the position of the radar to the closest point on the wall and $\psi$ describes the angle of the line to the point on the wall. Thus, the dynamic of joint tracking and wall estimation with constant velocity motion is defined as:

$$\begin{bmatrix} x_k \\ y_k \\ \dot{x}_k \\ \dot{y}_k \\ \rho_k \\ \psi_k \end{bmatrix} = \begin{bmatrix} F_k & 0_{2,2} \\ 0_{2,2} & I_{2,2} \end{bmatrix} \cdot \begin{bmatrix} x_{k-1} \\ y_{k-1} \\ \dot{x}_{k-1} \\ \dot{y}_{k-1} \\ \rho_{k-1} \\ \psi_{k-1} \end{bmatrix} + \begin{bmatrix} w_k \\ 0_{2,1} \end{bmatrix} \quad (5)$$

where $F_k$ is the constant velocity model, $w_k$ is the 4 by 1 zero mean Gaussian white noise vector with covariance matrix Q, and the noise of the wall is a 2 by 1 0 vector since the wall is fixed. The tracker with only the targets motion is called independent track $x_I$, while the tracker with both targets motion and wall parameters here is called joint tracker $x_j$.

If multipath is considered, each single target can generate both direct and in-direct path measurement. Consider the case where there is a single target and a single wall in the room. After the target T and the ghosts M1, M2, S have already been recognized by Hough transform based linear pattern extraction, the detections of M1 and M2 will be removed but T and S will be used in the tracking model. Each group of T and S is defined as a joint measurement, while the detection without the ghosts found is defined as an independent measurement, where $(R_T, \theta_T, D_T)$ is obtained by the direct-path model, and $(R_S, \theta_S, D_S)$ is obtained by the indirect path model.

The measurement model for the EKF is defined as:

$$h(x, y, \dot{x}, \dot{y}) = \begin{bmatrix} \sqrt{x^2 + y^2} \\ \operatorname{atan}\left(\frac{y}{x}\right) \\ \frac{x\dot{x} + y\dot{y}}{\sqrt{x^2 + y^2}} \end{bmatrix} \quad (6)$$

where $(x, y, \dot{x}, \dot{y})$ is the position and velocity of the target T in Cartesian coordinates. The measurement model $h_T$ of the real target T is obtained by $(x_T, y_T, \dot{x}_T, \dot{y}_T)$, while the measurement model $h_S$ of the second-order ghost S is obtained by $(x_S, y_S, \dot{x}_S, \dot{y}_S)$, which are calculated using equation (2). Given the measurement model, the independent and joint measurements are obtained by $$\hat{z}_{I_{k|k-1}} = h_{T_k}(x_{T_k}) + v_{T_k} \quad (7)$$

$$\hat{z}_{J_{k|k-1}} = \begin{bmatrix} h_{T_k}(x_{T_k}) \\ h_{S_k}(x_{S_k}) \end{bmatrix} + \begin{bmatrix} v_{T_k} \\ v_{S_k} \end{bmatrix} \quad (8)$$

where $\hat{z}_{I_{k|k-1}}$ and $\hat{z}_{J_{k|k-1}}$ indicate independent and joint measurement vectors of the prediction state $x_{T_k}$ and $x_{S_k}$ of the real target T and second-order ghost S, respectively, and $v_k$ is the measurement noise.

Until now, the independent and joint tracking and the independent and joint measurements are discussed for target tracking in multipath environment. The independent measurement model and tracker is running for normal moving targets, and once the Hough transform based algorithm finds out any ghosts, the joint measurement model and tracker will be active, thereby initiating the joint moving targets tracking and wall parameters estimation. The proposed disclosure further incorporates a multipath data association algorithm in order to handle the measurement associated to the track in the situations of independent to independent, independent to joint, joint to independent, and joint to joint.

For an independent tracker, the validation regions of independent and joint measurements are defined as:

$$V_{II} = \{z_I : [z_I - \hat{z}_{I_{k|k-1}}]^T S_{I_k}^{-1} [z_I - \hat{z}_{I_{k|k-1}}] \leq \gamma\} \quad (9a)$$

$$V_{IJ} = \left\{ z_J : \left[ \begin{bmatrix} z_J(1) \\ z_J(2) \\ z_J(3) \end{bmatrix} - \hat{z}_{J_{k|k-1}} \right]^T S_{I_k}^{-1} \left[ \begin{bmatrix} z_J(1) \\ z_J(2) \\ z_J(3) \end{bmatrix} - \hat{z}_{I_{k|k-1}} \right] \leq \gamma \right\} \quad (9b)$$

where $\gamma$ is a threshold of the gate. The $V_{II}$ checks out whether an independent track falls into the gate to update the independent tracker. Once there are some ghosts detected, the joint measurement integrates the detection of T and S together. The measurement of T (first 3 rows in the joint measurement vector) is then used in $V_{Ij}$ to check whether a joint measurement should be associated to the independent track. Once the joint measurement falls into the gate $V_{Ij}$, it means that the wall is confirmed and should be tracked by the joint dynamic model. This will happen in the case that a moving target is moving forward to a wall, and the ghosts are detected after the targets is getting closer to the wall.

When the joint tracker is active, the validation regions of independent and joint measurements are defined as:

$$V_{JI} = \left\{ z_I : \left[ z_I - \begin{bmatrix} \hat{z}_{I_{k|k-1}}(1) \\ \hat{z}_{I_{k|k-1}}(2) \\ \hat{z}_{I_{k|k-1}}(3) \end{bmatrix} \right]^T S_{I_k}^{-1} \left[ z_I - \begin{bmatrix} \hat{z}_{I_{k|k-1}}(1) \\ \hat{z}_{I_{k|k-1}}(2) \\ \hat{z}_{I_{k|k-1}}(3) \end{bmatrix} \right] \leq \gamma \right\} \quad (10a)$$

$$V_{JJ} = \{z_J : [z_J - \hat{z}_{J_{k|k-1}}]^T S_{I_k}^{-1} [z_J - \hat{z}_{I_{k|k-1}}] \leq \gamma\} \quad (10b)$$

The joint tracker keeps working when ghosts are observed and the joint measurement falls into the gate $V_{jj}$. When the ghosts cannot be detected, the gate $V_{jI}$ still checks if there is any independent measurement that can be associated with the tracker. This scenario will happen when a target is moving away from the wall, and, if the distance is large, the ghosts will not be observed. Then a joint tracker is not necessary to continue estimating the wall parameters. From the above description, it is conceivable that the multipath data association not only associates the measurement to the tracks but also identifies the existence of a wall.

Figure 6:
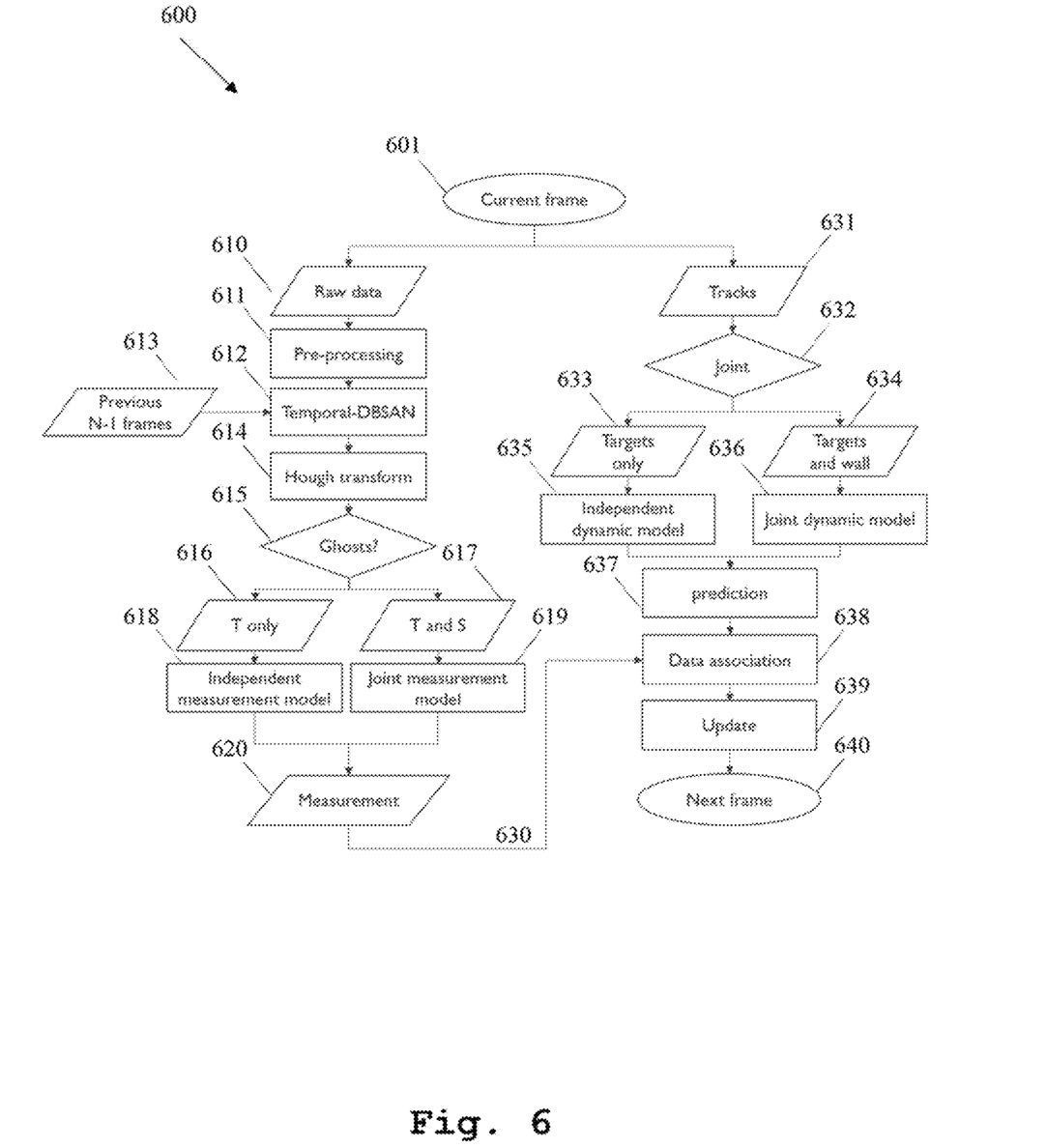
FIG. 6 shows a processing chain of the proposed algorithm, according to an example.

In FIG. 6, the process chain 600 of the proposed algorithm 600 is shown. The process chain 600 is herein represented by illustrating the process flow for ghost recognition, joint tracking and wall estimation, which are executed by the processor 303. Generally, the left side of the process chain 600 represents ghost recognition and/or mitigation and the right side represents the joint tracking and wall estimation.

The algorithm initiates for a current radar data frame 601 and accumulates the raw data 610. In a following step 611, the raw radar data are pre-processed, for instance by de-chirping and by plotting on a two-dimensional Range-Doppler map and further generating Range-Doppler detections, e.g. by a CFAR detector. In a further step 612, a temporal clustering algorithm is applied, especially based on the DBSCAN clustering algorithm. In this step, N−1 previous consecutive radar data frames are taken into account along with the current radar data frame. In a further step 614, a Hough transform based linear pattern extraction algorithm is applied in order to detect as well as distinguish the detections.

Upon the detection of a target and/or ghosts, the algorithm checks 615 whether the detections correspond to the target alone or the target and the ghosts. If the detection only comprises the target 616, the algorithm initiates the independent measurement model 618 as described above. If the detection comprises both the target and at least the second-order ghost 617, the algorithm initiates the joint measurement model 619 as described above. For both cases, the measurement data 620 are utilized for data association. Therefore, for each radar frame observation, an independent or a joint measurement is obtained, where the independent measurement is the range, angle, and Doppler of the target only while the joint measurement is the combination of the measurement from the target T and the second-order ghost S.

For each tracking step 631, the algorithm estimates that there are independent tracks and/or joint tracks from the previous step. The independent track 633 is valid when there is only a target measured, while the joint track 634 means that both target and the corresponding reflector could be identified as ghosts were detected. Therefore, the algorithm facilitates two types of tracking models, namely an independent tracking model 635 and a joint tracking model 636, depending on the ghost detection scenario. However, a joint detection could also be associated to an independent track when a target is moving close to the wall and suddenly the ghosts appear. Similarly, a joint detection could also be associated to an independent track when a target moves away from a wall and the ghosts disappear.

The algorithm then performs predictions based on either independent tracking model 635 or joint tracking model 637, thereby estimating the room boundary, which is followed by measurement data association from either the independent measurement model 618 or the joint measurement model 619. The filter parameters are updated 639 accordingly and the next radar frame 640 is initiated, where the algorithm executes the above-mentioned processes iteratively.

The radar measurement obtained from the measurement models may correspond to the target T or both target T and second-order ghost S. The tracking models track targets independently or perform joint target and wall tracking, for example by using an extended Kalman filter. The radar measurements detecting a target T or target of ghost S are associated to both independent and joint tracks, so that for each time the extended Kalman filter parameters are updated of all tracks.

Therefore, for each frame of radar data cubelet, temporal-clustering is applied to the range-Doppler maps of consecutive N frames. The Hough-transform based ghosts recognition determines whether there is a group of the target T, first-order ghost M, and second-order ghost S in the radar detection. The first-order ghost M is mitigated, however, the target T and the second-order ghost S are utilized for joint tracking and wall estimation.

Once the target T and the second-order ghost S are determined, the measurements are fed to the joint tracking and wall estimation part. The multipath data association algorithm associates the independent or joint measurement to an independent or joint tracker, and simultaneously confirms the existence and non-existence of the wall. The output of the algorithm recognizes the multipath ghosts in the radar detection and through the real target T and second-order ghost S detection; the tracking result includes both the motion of the targets and the position of the wall.

Figure 7A:
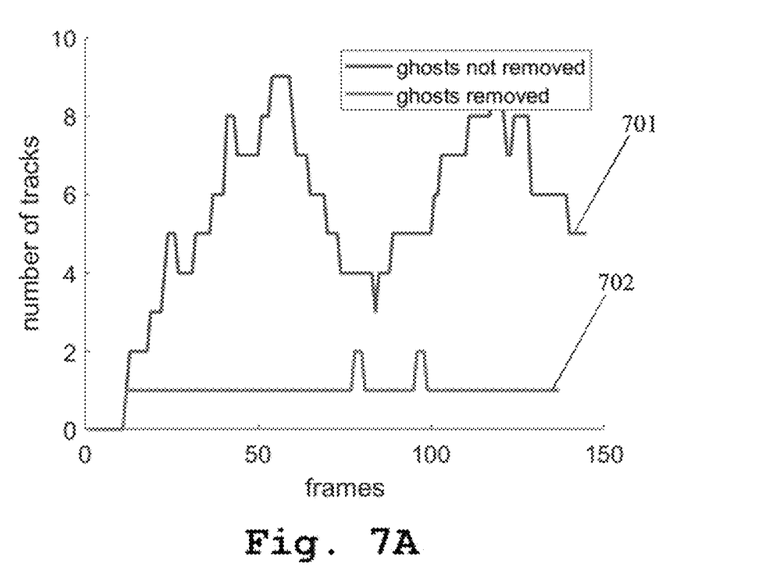
FIG. 7A shows tracking of a single pedestrian before and after Hough transform based ghost mitigation, according to an example.
Figure 7B:
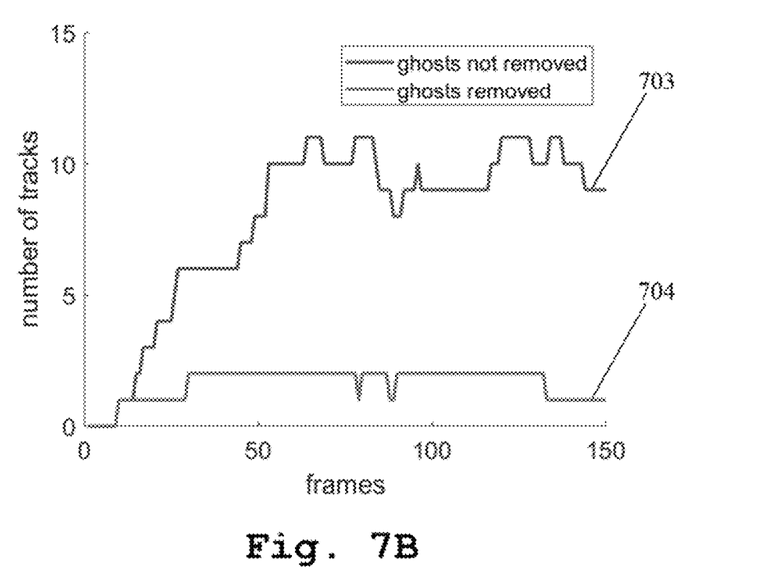
FIG. 7B shows tracking of two pedestrians before and after Hough transform based ghost mitigation, according to an example.

In FIG. 7A and FIG. 7B, tracking of real targets is illustrated. Particularly, in FIG. 7A, the tracking of a single pedestrian is illustrated where the upper tracks 701 represent tracks when the ghosts are not removed, whereas the lower tracks 702 represent tracks when the ghosts are removed. Similarly, in FIG. 7A, the tracking of two pedestrians is illustrated where the upper tracks 703 represent tracks when the ghosts are not removed, whereas the lower tracks 704 represent tracks when the ghosts are removed. It can be seen that, even when there is only one real target, standard tracking creates a significant number of false tracks due to strong multipath reflections. However, after mitigating the ghosts using the proposed disclosure, most of the false tracks are removed.

Figure 8A:
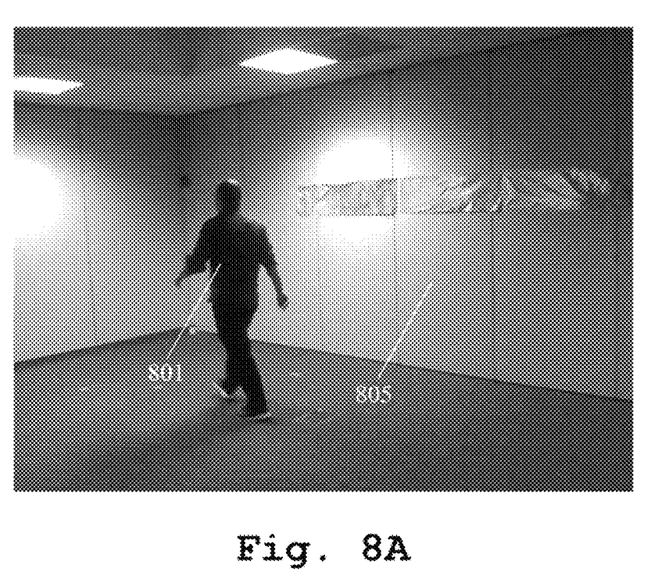
FIG. 8A shows a scenario of the measurement for joint tracking and wall estimation of a single target, according to an example.
Figure 8B:
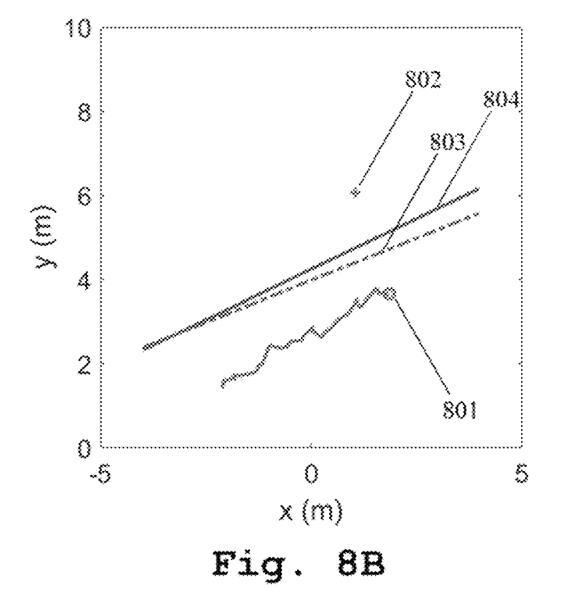
FIG. 8B shows the measurement results for the measurement scenario of FIG. 8A, according to an example.

In FIG. 8A and FIG. 8B, the joint tracking and wall estimation of a single target are illustrated. In particular, FIG. 8A shows the scenario of the measurement where a single pedestrian 801 moves along a wall 805, which acts as a specular reflector. In FIG. 8B, the measurement result for the measurement scenario of FIG. 8A is illustrated. The X-Y map is plotted for both the real target 801 and the second-order ghost 802, where both axes represent distance in meters. It can be seen, based on the trajectory of the target 801, the wall converges from the dashed line 803 to the solid line 804, which at this point reflects the actual boundary of the wall 805.

It is to be noted that the inventive ghost recognition and mitigation scheme is not limited to the Hough transform based linear pattern extraction algorithm as described above. The proposed linear pattern extraction algorithm can be implemented using any line extraction algorithm and further by checking the periodicity of the three collinear and equidistant points representing the target T, first-order ghost M, and second-order ghost S. As an extreme measure, it is further possible to iteratively check if there is a point located in the segments of the other two points by setting a threshold of the position error.

The embodiments of the present disclosure can be implemented by hardware, software, or any combination thereof. Various embodiments of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Although the disclosure has been illustrated and described with respect to one or more implementations, equivalent alterations and modifications will occur to others skilled in the art upon the reading and understanding of this specification and the annexed drawings. In addition, while a particular feature of the disclosure may have been disclosed with respect to only one of several implementations, such feature may be combined with one or more other features of the other implementations as may be desired and advantageous for any given or particular application.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of

What is claimed is:

1. A method for multipath ghosts recognition for a multiple-input-multiple-output radar with collocated antennas, the method comprising:
   generating a two-dimensional Range-Doppler map for consecutive radar data frames,
   applying a temporal clustering algorithm to the consecutive radar data frames, and
   applying a linear pattern extraction algorithm on the two-dimensional Range-Doppler map, wherein the two-dimensional Range-Doppler map comprises detections from a target, a first-order ghost, and a second-order ghost with respect to one wall reflector,
   wherein the method further comprises recognizing, via the linear pattern extraction algorithm, a set of three points in the two-dimensional Range-Doppler map corresponding to the detections from the target, the first-order ghost, and the second-order ghost.

2. The method according to claim 1, wherein the linear pattern extraction algorithm comprises a split-and-merge algorithm.

3. The method according to claim 1, wherein the linear pattern extraction algorithm comprises a Random Sample Consensus algorithm.

4. The method according to claim 1, wherein the linear pattern extraction algorithm comprises a Hough transform based linear pattern extraction algorithm.

5. The method according to claim 1, wherein the set of three points in the two-dimensional Range-Doppler map are collinear and are equidistant.

6. The method according to claim 1, wherein the method further comprises comparing respective Range and Doppler values of the set of three points in the two-dimensional Range-Doppler map, thereby recognizing the detections from the target, the first-order ghost, and the second-order ghost.

7. The method according to claim 1, wherein the method further comprises implementing a tracking algorithm in order to estimate a state of the target.

8. The method according to claim 1, wherein the method further comprises implementing a joint target tracking algorithm and wall estimation algorithm in order to estimate a state of the target and of the second-order ghost.

9. The method according to claim 8, wherein the joint target tracking algorithm comprises non-linear filtration as an Extended Kalman Filter.

10. The method according to claim 1, wherein the method further comprises implementing a Simultaneous Target and Multipath Positioning model in order to estimate parameters of a reflector associated with the first-order ghost and the second-order ghost.

11. The method according to claim 1, wherein the two-dimensional Range-Doppler map further comprises detections from a plurality of targets, a plurality of first-order ghosts, and a plurality of second-order ghosts.

12. The method according to claim 11, wherein the method is performed iteratively.

13. The method according to claim 1, wherein the target is non-rigid.

14. The method according to claim 1, wherein the multiple-input-multiple-output radar is a frequency-modulated continuous-wave radar.

15. A system for indoor multipath ghost recognition comprises:
   a multiple-input-multiple-output radar with collocated antennas, and
   a processor operably coupled to the multiple-input-multiple-output radar,
   wherein the processor is configured to generate a two-dimensional Range-Doppler map for N number of consecutive radar data frames,
   wherein the processor is further configured to apply a temporal clustering algorithm to the N number of consecutive radar data frames,
   wherein the processor is further configured to apply a linear pattern extraction algorithm on the two-dimensional Range-Doppler map, and
   wherein the two-dimensional Range-Doppler map comprises detections from a target, a first-order ghost, and a second-order ghost with respect to one wall reflector,
   wherein the processor is configured to recognize, via the linear pattern extraction algorithm, a set of three points in the two-dimensional Range-Doppler map corresponding to the detections from the target, the first-order ghost, and the second-order ghost.

16. The system according to claim 15, wherein the linear pattern extraction algorithm is a split-and-merge algorithm, a Random Sample Consensus algorithm, or a Hough transform based linear pattern extraction algorithm.

17. A method for multipath ghosts recognition for a multiple-input-multiple-output radar with collocated antennas, the method comprising:
   generating a two-dimensional Range-Doppler map that includes data from radar data frames collected consecutively over time,
   applying a temporal clustering algorithm to the radar data frames, and
   applying a linear pattern extraction algorithm on the two-dimensional Range-Doppler map, thereby identifying a range and a velocity for each of (i) a target, (ii) a first-order ghost of the target, and (ii) a second-order ghost of the target, wherein the first-order ghost represents a first signal from the target that reflects from a static object once before being detected by the collocated antennas, and wherein the second-order ghost represents a second signal from the target that reflects from the static object twice before being detected by the collocated antennas.

18. The method according to claim 1, wherein the multiple-input-multiple-output radar comprises a Doppler radar.

19. The method according to claim 17, wherein the linear pattern extraction algorithm comprises a split-and-merge algorithm.

20. The method of claim 17, wherein the linear pattern extraction algorithm comprises at least one of: a split-and-merge algorithm, a Random Sample Consensus algorithm, or a Hough transform based linear pattern extraction algorithm.

* * * * *